United States Patent
Bakker et al.

(10) Patent No.: US 6,296,412 B1
(45) Date of Patent: Oct. 2, 2001

(54) HAND-SEPARABLE ROLLER LATCHING DEVICE

(75) Inventors: Johan P. Bakker, Brighton; Gunter A. Meyn, Clinton Township, both of MI (US)

(73) Assignee: Unisys Corporation, Blue Bell, PA (US)

( * ) Notice: Subject to any disclaimer, the term of this patent is extended or adjusted under 35 U.S.C. 154(b) by 0 days.

(21) Appl. No.: 09/314,505

(22) Filed: May 19, 1999

Related U.S. Application Data

(60) Provisional application No. 60/086,533, filed on May 22, 1998.

(51) Int. Cl.[7] ................................................ F16C 13/00
(52) U.S. Cl. ................................. 403/24; 403/1; 403/155
(58) Field of Search .............................. 403/154, 155, 403/150, 151, 161, 119, 164, 24, 321, 322.1, 409.1; 400/691, 692, 569

(56) References Cited

U.S. PATENT DOCUMENTS

| | | |
|---|---|---|
| 3,307,677 | 3/1967 | Frank et al. . |
| 3,915,281 | * 10/1975 | Blomquist et al. .................. 400/509 |
| 4,865,305 | * 9/1989 | Momiyama et al. ................. 271/116 |
| 5,472,287 | * 12/1995 | Hasegawa et al. .................. 400/585 |
| 5,518,332 | * 5/1996 | Katoh .................................. 403/155 |
| 5,842,797 | * 12/1998 | Lee .................................... 400/216.1 |

* cited by examiner

*Primary Examiner*—Harry C. Kim
(74) *Attorney, Agent, or Firm*—Mark T. Starr; Harness Dickey & Pierce

(57) ABSTRACT

A roller assembly for releasably latching a roller to a drive shaft in which a cylindrical roller body has an internal bore and a one-way clutch through which the drive shaft protrudes into a recess within the cylindrical roller body, the recess retaining a spring that engages the drive shaft, and a cap having a cam fixedly rotates about the cylindrical roller body so that the cam engages and urges the spring outward releasing the drive shaft.

12 Claims, 7 Drawing Sheets

PART SECTION
THRU CR

TOP VIEW

BOTTOM VIEW

SIDE VIEW

US 6,296,412 B1

HAND-SEPARABLE ROLLER LATCHING DEVICE

This application claim benefit to provisional application No. 60/086,533 May 22, 1998.

BACKGROUND

1. Field of the Invention

This invention relates to paper-handling machinery, and specifically, to devices for mounting, assembling and disassembling rotating roller elements.

2. Discussion of the Prior Art

Workers in the art are familiar with the conventional constructions used for high speed paper-handling machinery, such as printers, page handlers, collators, sorting machinery and the like. A very typical construction involves a number of driven cylindrical rollers or drums, the circumferences of which are furnished with a rubber or other, like frictional material surface which drive the paper item by friction and form a "track" or path down which the paper is driven.

Paper itself is an abrasive and deleterious material, and the inks and coatings often found on paper products contain chemicals, abrasives and other materials. These characteristics tend to limit the useful life of the frictional coatings upon drive rollers, with the result that provision must be made for the frictional material to be replaced from time to time with fresh material. As an example, a conventional small check-sorting device such as the Unisys SNDP product will typically require that the friction drive material on drive rollers be replaced after 250,000 documents have been driven if feeding and transport performance are to be maintained. In normal operation, this attention would be required approximately every ninety (90) days.

Typically, in large and costly machinery, such replacement function is a task assigned to skilled service personnel and involves a certain degree of disassembly and inspection. Replacement processes are conventionally designed to be performed by trained personnel who have suitable tools and equipment available, and for this reason, rollers are typically mounted by means and methods which require tools for disassembly—screws, retaining rings and the like. In fact, it is sometimes considered advantageous to make roller disassembly difficult or impossible without the use of special tools, as tending to eliminate unauthorized disassembly by unskilled personnel.

With the present trend to smaller and simpler paper handling machinery, especially in the banking and financial services markets, we find an accompanying trend away from the concept of routine service by skilled personnel, and a trend instead towards having routine service performed by unskilled users—the clerks and tellers who typically use these machines on a day-to-day basis. As paper-handling machines become smaller and less expensive, the costs of service by trained personnel become proportionally much higher when seen as part of the "lifetime cost" of owning and operating the machine. Accordingly, the customers for these machines are demanding that routine service attentions to the machines, such as the replacement of friction rollers, be made within the capacity of unskilled operators to perform reliably and without oversight.

SUMMARY OF THE INVENTION

Apparatus for attaching a cylindrical driven roller to its drive shaft which at once secures the roller to its shaft for normal operation, is instantly removable without the use of tools, and which is made capable of latching itself securely automatically if the operator should fail to secure it upon reassembly. This method is fully integrated with the present conventional processes used to manufacture such rollers (eg thermoplastic injection molding) and uses a minimum number of low cost parts to achieve these functions.

In the instant case for which this invention is conceived, the requirements for the latching mechanism are more stringent than is often found in such applications. To avoid interfering with the paper-feeding function, all exterior features of the drive roller are required to have the same cylindrical profile as the roller itself—no protrusions or irregularities of form are permitted which might catch or impede the paper as it passes. And some of the rollers which require replacement are also provided, for other reasons not directly involved with this invention, with a "one-way clutch" feature—that is to say, they are mounted to their driving shafts with a one-way clutch which engages and drives in one rotational direction but allows the roller to "free-wheel" on its shaft if it is turned in the opposite rotational direction. To avoid any interference with the operation of this "one-way clutch" function, any latching mechanism employed must leave the roller perfectly free to rotate upon its shaft—in other words, the latch may not rely upon, nor impose, any rotational drag whatever between the roller and its shaft in the operational condition. Finally, as is often the case in machines which are made especially compact, many of the rollers which are apt for the application of the instant invention are closely surrounded by other parts for the machine and the access available to an operator to operate any latching mechanism and extract and replace the roller itself is very much restricted.

BRIEF DESCRIPTION OF THE DRAWINGS

These and other features of the present invention will be appreciated by reference to the following description of the present preferred embodiments, which should be considered in conjunction with the accompanying drawings, wherein like reference symbols denote like elements.

DETAILED DESCRIPTION

Figure 1:
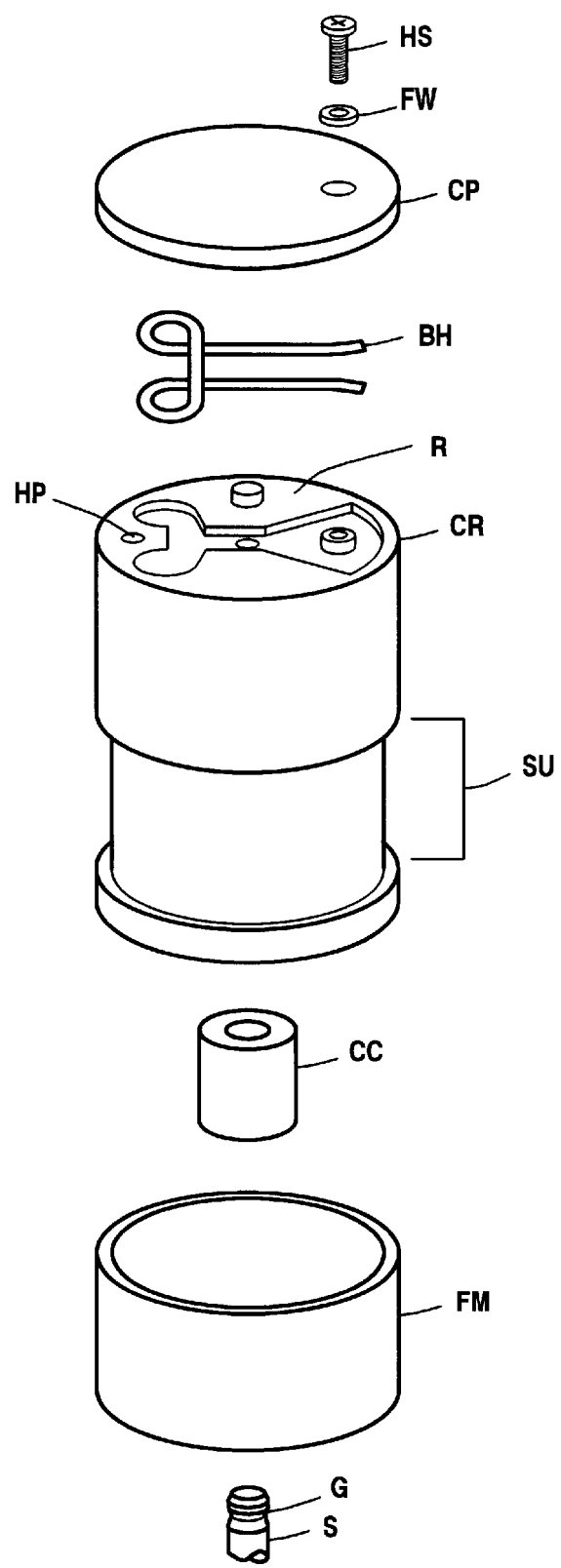
FIG. 1 depicts an exploded view of a roller assembly constructed according to the present invention.

FIG. 1 depicts an exploded view of a roller RA assembly constructed according to the present invention. The roller drive shaft S is mounted in bearing or support means attached to the structure of the machine (not depicted) as will be understood by workers in the art. Shaft S is rotationally driven by conventional drive means (eg toothed belt, gear, etc), once again not depicted, but as will be understood by workers in the art.

The rotational motion of shaft S is transmitted to cylindrical roller CR by means of a cylindrical one-way clutch CC, which is pressed into a mating bore on the lower face of roller CR. The operation of this clutch CC is not described but is a conventional roller clutch assembly. By the action of clutch CC, the drive of shaft S is so arranged that when shaft S is driven in the clockwise direction, the action of clutch CC is to "lock" the roller CR to the shaft S and cause it to rotate in the same direction. When shaft S is stationary, or when some external means attempts to drive roller CR in the clockwise direction at a rotational speed faster than the driven speed of shaft S, the action of clutch CC is to "unlock" roller CR from shaft S, allowing the roller CR to freewheel in the clockwise direction. When shaft S is stationary, any attempt to externally drive roller CR in the anti-clockwise direction will cause clutch CC to "lock" to shaft S and the roller CR will be restrained from turning anti-clockwise.

Such a one-way, overrunning drive arrangement is a common arrangement used in paper-driving mechanisms, the purpose being to allow consecutive paper-driving rollers to be driven at progressively higher speeds without placing undue tensional forces upon the paper.

We preferably construct roller CR of "Delrin" acetal homopolymer material, a product (registered trade mark) of the E. I. Dupont de Nemours Corporation, said material being selected for its low friction, excellent wear and ease of manufacture using conventional high-pressure injection molding processes.

To maintain alignment of roller CR on shaft S and minimize undesirable lateral forces on the internal parts of clutch CC, shaft S passes through a stepped bore through the axis of roller CR, the end of which bore opposite the end of roller CR containing clutch CC is so manufactured as to provide a close cylindrical journal bearing surface b (FIG. 2) upon the end of shaft S.

The outer periphery of roller CR is provided with a stepped undercut SU, into which a toroidal ring of suitable friction material FM is fitted. This ring, typically of a rubber or urethane material, is installed by stretching it over roller CR and setting it into undercut SU, and this friction material is so constructed and disposed to act against other machine elements as to drive the paper items in the desired manner, which construction is not shown in detail but will be well understood by workers in the art.

In certain cases, one can eliminate or modify the clutch CC and/or the friction ring FM—e.g. the friction ring or other friction means can be disposed across other portions of roller CR (e.g. all of CR, or spaced bands thereon). In other uses, friction ring FM can be entirely dispensed with (e.g. where the roller assembly is a mere idler).

The intention of the present invention is to teach apparatus whereby roller CR, complete with friction material ring FM and clutch CC, may be removed axially from shaft S, without the use of tools. Said apparatus must be capable of being understood and operated without error by unskilled personnel. It must act so as to secure roller CR to shaft S securely, so that the roller cannot move along its axis during operation, yet immediately release the roller when desired. It may exert no rotational resistance between roller CR and shaft S in either direction when it is secured, which might interfere with the 'overrunning' function described. It must be operable with a minimum intrusion into the space surrounding the roller. And finally. it must be able to tolerate, without damage, being removed by an operator who fails to operate the removal means correctly (as intended) and who proceeds, for example, to simply pull the roller from the shaft, or to press it back onto the shaft.

Figure 5:
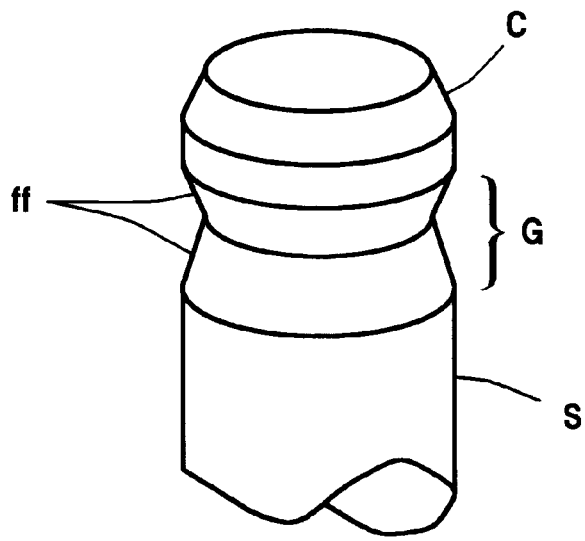
FIG. 5 depicts perspective and side views of the shaft component of the assembly of FIG. 1.
Figure 5:
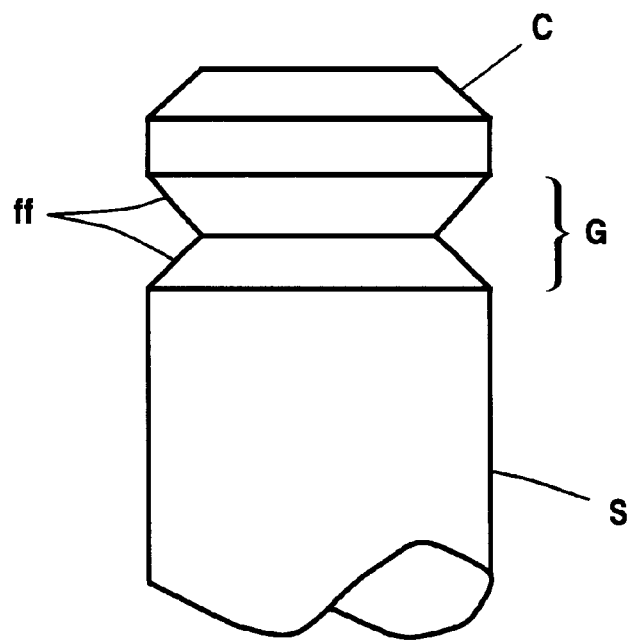

These functions are provided as follows:

The exposed end of shaft S is provided with a recessed circumferential groove G of the shape which is shown in greater detail in FIG. 5. This groove is so formed as to have two angled flanks ff as shown. The extreme end of shaft S is also provided with an angled circumferential chamfer c, as shown.

Figure 2:
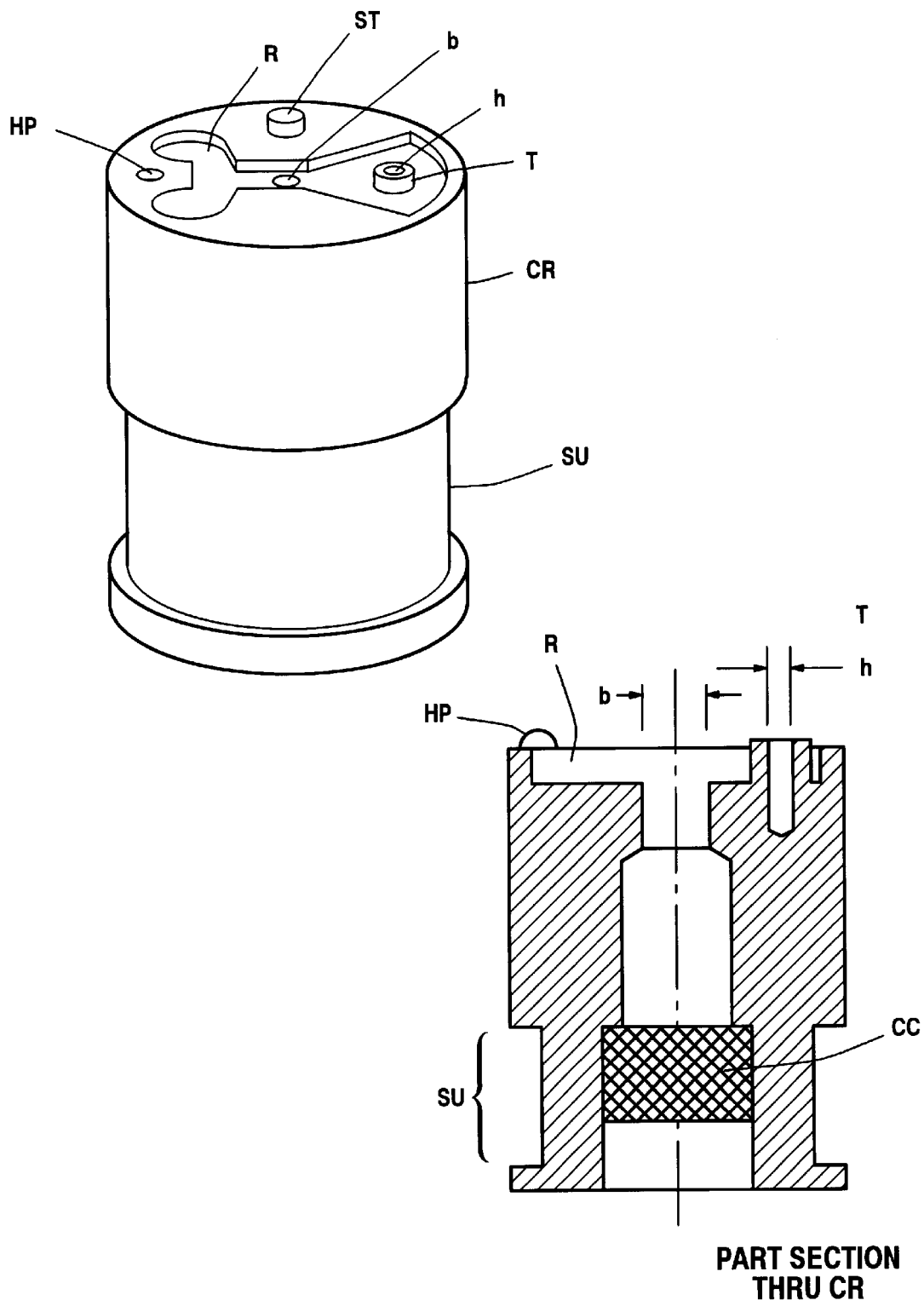
FIG. 2 depicts perspective and cross-sectional views the roller component of the assembly of FIG. 1.
Figure 4:
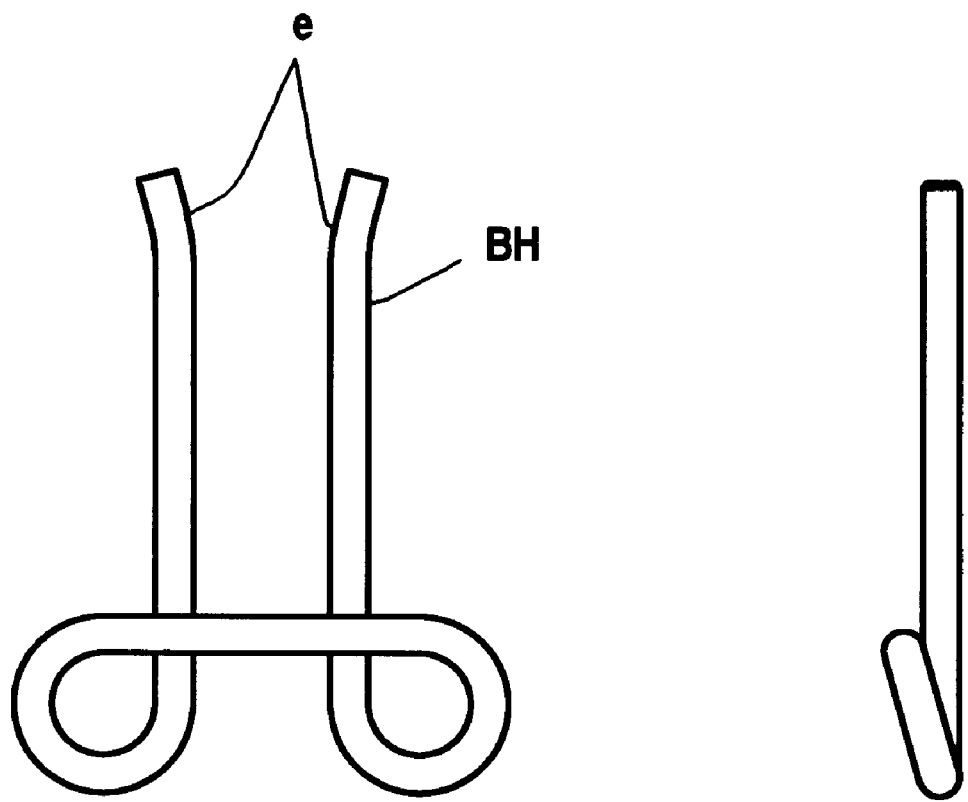
FIG. 4 depicts top and side views of the spring component of the assembly of FIG. 1.

An end surface of cylindrical roller CR is provided with a recess R which is shaped and constructed as shown in more detail in FIG. 2. This recess is formed and constructed to provide a location for bi-helical spring BH, which is "nested" into the upper surface of roller CR and which is flush below said surface. Spring BH is shown in detail in FIG. 4.

Spring BH consists of a single piece of tempered steel wire which is formed into a bi-helical shape with two free ends $e_1$ and $e_2$ as shown. The two helical sections of the spring fit within suitably formed portions of recess R such that spring BH is effectively loosely "captured" in every axis except along the axis of roller CR. The free ends $e_1$ and $e_2$ of spring means BH extend meridianally across the face of roller CR, such that each free end e passes chordally and oppositionally to the other free end e across the circular bearing surface b which is present in the upper face of roller CR as described.

It will thus be seen that if roller CR, with spring BH in place, is axially assembled onto shaft S, and if the free ends $e_1$ and $e_2$ of spring BH are radially expanded away from each other until groove G in shaft S is suitably located, and then released, the free ends $e_1$ and $e_2$ are then free to move towards each other and to engage in groove G.

Figure 3:
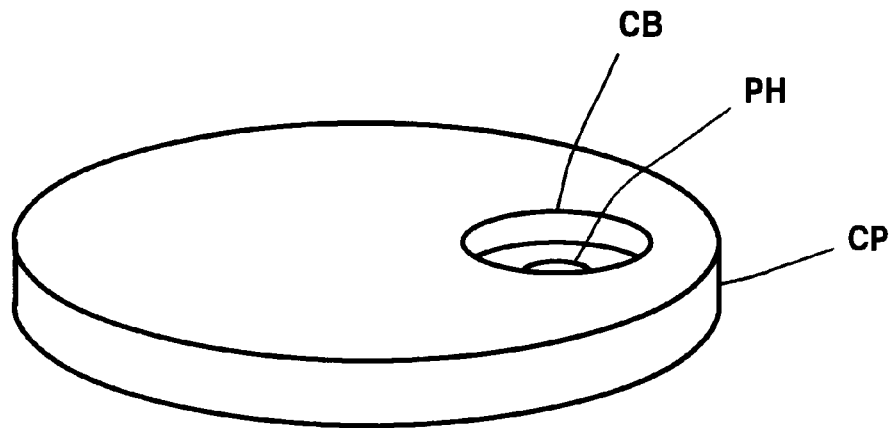
FIG. 3 depicts top and bottom views of the cap component of the assembly of FIG. 1.
Figure 3:
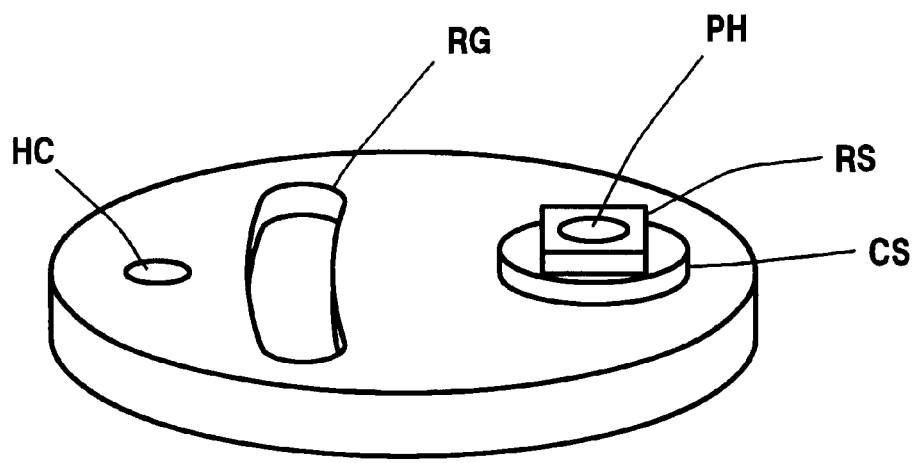

To obtain this action, recess R is further provided with a cylindrical tenon T, located eccentrically from the axis of roller CR, as shown for example in FIG. 2, which tenon is itself provided with an axial cylindrical hole h, as shown. Tenon T provides a pivoting and securing point for cap part CP, which is shown in more detail in FIG. 3. Cap part CP is made in the form of an extremely short cylinder having the same diameter as roller CR. The cap is constructed with a through pivot hole PH, located eccentrically from the axis of cap CP by the same dimension as tenon T is located eccentrically from the axis of roller CR. On the underside of the cap, a biplanar tenon is formed coaxial to pivot hole PH, said tenon having two coplanar sections, one cylindrical section cs and one rectangular section RS. Pivot hole PH is further provided with a coaxial counterbore CB in its upper surface.

We preferably construct cap CP of the same Delrin acetal homopolymer material which we prefer for roller CR, as described above, and for the same reasons.

Figure 6:
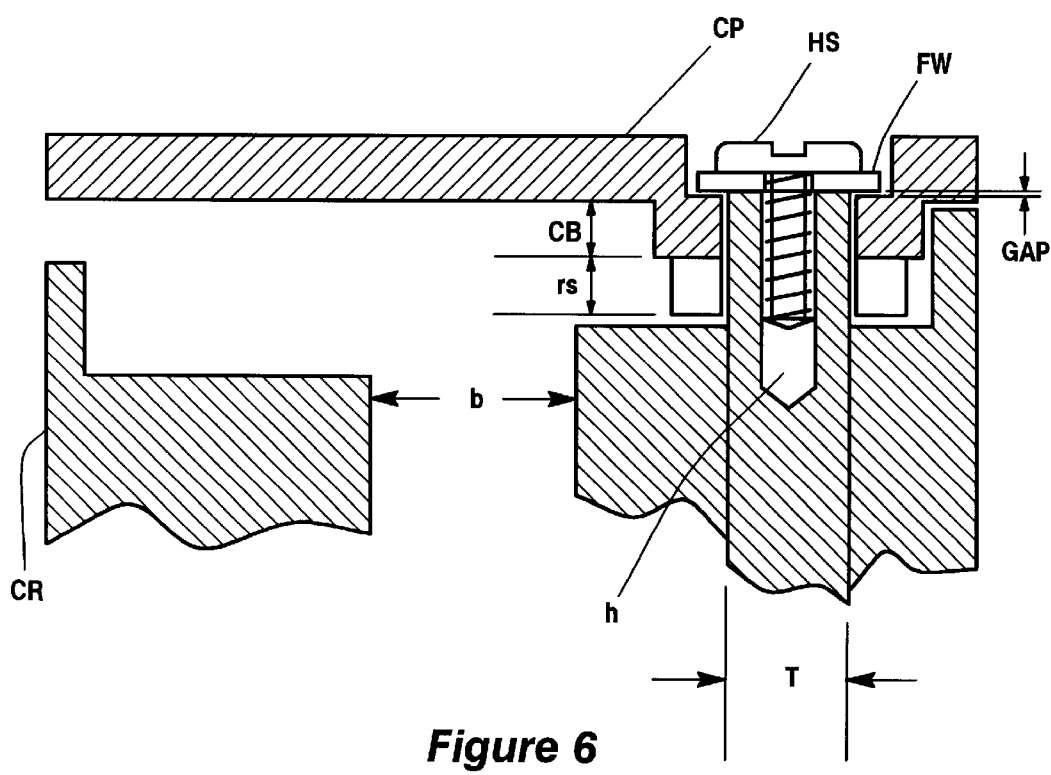
FIG. 6 depicts a partial sectional view of the assembly of FIG. 1, showing the relationship between the cap, roller and securing screw.

The dimensions and depths of pivot hole PH, counterbore CB and tenon T are so constructed (as shown in FIG. 6) that when cap CP is assembled to roller CR, a small gap (of the order of 0.003") remains between the lower face of counterbore CB and the upper face of tenon T. In this manner, when securing cap CP to roller CR using screw HS and flat washer FW, said screw HS may be fully tightened and yet cap CP will always be free to pivot about the common axis of pivot hole PH and tenon T.

Consider now the assembly of cap CP to the upper face of roller CR, with spring means BH already located in recess R as described previously. Pivot hole PH in cap CP is so constructed as to fit closely upon tenon T, and cap CP is axially secured by helical screw HS and flat washer FW. In this manner, when screw HS and washer FW are installed and tightened, cap CP is attached to the upper surface of roller CR and is constrained from movement in every axis save the ability to rotate freely about the common axis of tenon T and pivot hole PH.

Figure 7:
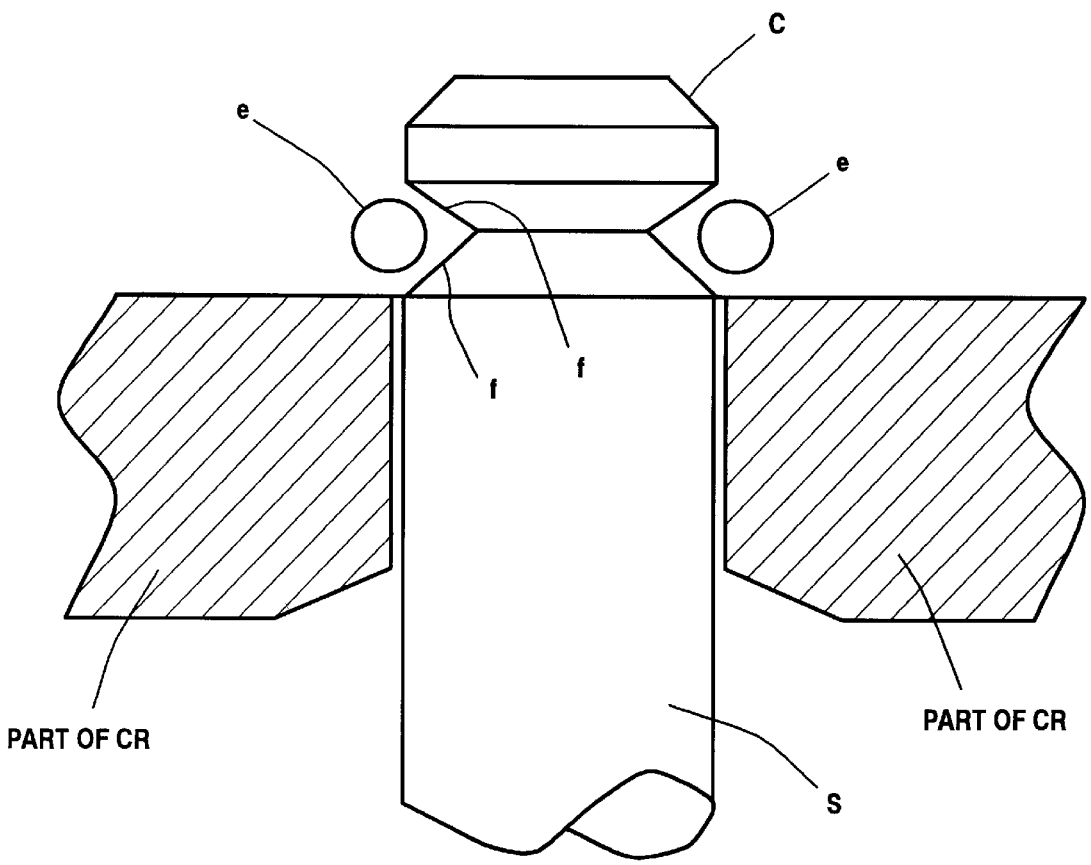
FIG. 7 depicts a partial sectional view of the assembly of FIG. 1, showing the relationship between the roller, spring and shaft.

It will thus be seen that cylindrical section cs of the biplanar tenon of cap CP now lies above the free ends $e_1$ and $e_2$ of spring means BH, and prevents them from moving upwards. Rectangular section RS of the biplanar tenon of cap CP lies between the free ends $e_1$ and $e_2$ of spring BH, and holds them apart so that the two free ends $e_1$ and $e_2$ are positioned chordally to bearing surface b. The spring reaction of both free ends $e_1$ and $e_2$ act upon the flanks of rectangular section rs, producing a self-centering or "detent" action of cap CP which tends to hold it coaxial with roller CR. And the width of the flanks of rectangular section RS sets the chordal relationship between each of the free ends $e_1$ and $e_2$ of spring BH and the flanks ff of groove G and shaft S. We prefer that the relationship be set such that each free end $e_1$ and $e_2$ is placed such that it is close enough to the axis of shaft S that it cannot be drawn upwards axially, yet far enough away that it does not contact the flanks ff of groove G. This preferred relationship is shown in more detail in FIG. 7, and this relationship is achieved and maintained by so arranging the width of the flanks of rectangular section RS as to suitably separate the free ends $e_1$ and $e_2$ of spring BH, having regard to the dimensions and features of shaft S, as will be understood by workers in the art.

To support the "detent" action of cap CP described, and to reinforce in the mind of the operator the positive position of the "locked" orientation of cap CP, a small hemispherical protrusion HP on the upper face of roller CR, together with a matching oriented hemispherical cavity HC on the under face of cap CP is further provided. Said protrusion HP and cavity HC are so constructed and located that they are axially aligned when cap CP is in "detent" position. As cap CP is rotated, said protrusion HP will engage the under surface of cap CP and deflect it upwards by the spring reaction of the material of the cap. As the cap CP is further rotated, said protrusion HP and cavity HC will become aligned and cap CP will no longer be deflected, but will straighten and cause protrusion HP and cavity HC to become engaged and provide a measure of resistance to the rotation of cap CP from the "detent" position. Said engagement of protrusion and cavity and straightening of cap CP occurs with a "snap" which is both audibly and tactiley apparent to the operator, indicating positively that the cap CP has been rotated to the "detent" position and is secure.

If cap CP is now rotated about the common axis of tenon T and pivot hole PH, rectangular section RS will rotate with it, and will exert a symmetrical, expanding, cam action on each of the free ends $e_1$ and $e_2$ of spring BH. This expanding action will be maximal when cap CP has been turned ninety degrees (90°) from its rest position. The amount by which the free ends $e_1$ and $e_2$ are expanded is determined by the shape of rectangular section RS, and so constructed that free ends $e_1$ and $e_2$ are sufficiently expanded to allow them to pass radially over shaft S and thus free roller CR from the shaft.

In this way, roller CR is freed from shaft S and may be drawn axially upwards and removed.

It will be noted that if the cap is rotated beyond 90° from its rest position, as described, the expanding cam action described will be reversed and free ends $e_1$ and $e_2$ will move back together and re-engage shaft S. To prevent this potentially confusing and undesired action, a stop is provided which prevents cap CP from being turned beyond 90° from its rest position. This stop consists of stop tenon ST formed in the upper face of roller CR, which tenon engages in a recessed groove RG, radial to the common axis of tenon T and pivot hole PH, as shown. The action of the stop tenon ST in a recessed groove RG is to restrict the rotation of cap CP to an arc of 90°, more or less, and also to restrict the direction from the rest position of cap CP in which it can be turned. In the preferred embodiment, the cap CP is restricted to turn only clockwise from its rest position, but workers will understand that the position of stop tenon ST and recessed groove RG may be adjusted to obtain other limits and directions of rotation, as may be dictated by a specific application.

Replacing the roller upon the shaft is the reverse of the process of removal. With the cap CP held rotated 90° from its "detent" position, the cap is lowered onto the shaft until the upper end of the shaft contacts the under face of cap CP. At this point, cap CP is rotated to its rest position, and by the reverse action of rectangular cam section RS (as described above) the free ends $e_1$ and $e_2$ of spring means BH are closed together by their spring action and engage the groove G, securing the assembly to the shaft as before.

It will be understood that the preferred embodiment described herein are only exemplary, and that the invention is capable of many modifications and variations of construction, arrangement and use without departing from the spirit of the claims. The above examples of possible variations of the present invention are merely illustrative and accordingly the present invention is to considered as including all possible modifications and variations coming within the scope of the invention as defined by the claims appended hereto.

What is claimed is:

1. A roller assembly comprising:
   a substantially cylindrical roller body having an internal bore for receipt of a one-way clutch element and a drive shaft for said roller body;
   a recess within said cylindrical roller body for retaining a spring member having first and second ends, said spring member substantially retaining said drive shaft; and
   a cap member having a cam, said cap member being fixedly rotatable about said cylindrical roller body such that said cam lies between said first end and said second end of said spring member, said cam urging said first end and said second end away from each other thereby releasably disengaging said drive shaft.

2. The roller assembly of claim 1 wherein said cam does not come in contact with said cylindrical roller body.

3. A releasable roller assembly comprising:
   a mounting shaft having a groove;
   a substantially cylindrical roller having a recess for receiving a spring member, said spring member having first and second ends;
   said mounting shaft engaging said cylindrical roller such that said groove is engaged by said first and second ends of said spring member, therein retaining said mounting shaft in position; and
   a cap member having a cam, said cap member being fixedly rotatable about said cylindrical roller such that said cam, upon rotation, flexes said first and second ends of said spring member away from each other thereby releasably disengaging said mounting shaft.

4. The releasable roller assembly of claim 3 wherein said cylindrical roller further comprises a one-way clutch, said one-way clutch controlling the directional rotation of said mounting shaft.

5. A roller assembly comprising:
 a drive shaft having a first and second end, said first end having a groove and said second end having a gear;
 a substantially cylindrical body having a throughbore for accepting a one-way clutch, and having a recess having a first cam;
 said first end of said drive shaft being placed through said one-way clutch and said throughbore, said groove of said first end protruding into said recess;
 a spring member having two free ends, said spring member being placed in said recess such that said free ends straddle said first cam and substantially engage said groove of said drive shaft allowing said drive shaft to rotate freely;
 a cap having a circumference substantially equivalent to the circumference of said cylindrical body, said cap having a first and second surface, said first surface having a pivot hole for accepting a fastener and said second surface having a second cam opposite said pivot hole, said cap being positioned and fastened over said recess such that said second cam accepts said first cam; and
 said cap being rotatable around said first cam such that upon rotation said free ends of said spring member are engaged by said second cam urging said free ends outward therein disengaging said free ends from said groove allowing removal of said cylindrical body from said drive shaft.

6. The roller assembly of claim 5 wherein said cylindrical body has a stepped undercut for accepting friction material.

7. The roller assembly of claim 5 wherein said cylindrical body further comprises a stop and said cap further comprises a recessed groove, said stop engaging said recessed groove to control rotation.

8. The roller assembly of claim 5 wherein the engagement between said first cam and said second cam results in a gap allowing freedom of rotation.

9. A roller assembly comprising:
 a substantially cylindrical roller body having an internal bore for receipt of a one-way clutch element and a drive shaft for said roller body;
 a recess within said cylindrical roller body for retaining a spring member having first and second ends, said spring member substantially retaining said drive shaft, said drive shaft having a groove that is substantially engaged by said first end and said second end of said spring member, said engagement allowing free rotation in a preselected direction of said drive shaft; and
 a cap member having a cam, said cap member being fixedly rotatable about said cylindrical roller body such that said cam lies between said first end and said second end of said spring member, said cam urging said first end and said second end away from each other thereby releasably disengaging said drive shaft.

10. A roller assembly comprising:
 a substantially cylindrical roller body having an internal bore for receipt of a one-way clutch element and a drive shaft for said roller body;
 a recess within said cylindrical roller body for retaining a spring member having first and second ends, said spring member substantially retaining said drive shaft,
 a cap member having a cam, said cap member being fixedly rotatable about said cylindrical roller body such that said cam lies between said first end and said second end of said spring member, said cam urging said first end and said second end away from each other thereby releasably disengaging said drive shaft, said cylindrical roller body further including a stop and said cap member further including a groove, said stop engaging said groove for establishing a range of rotation of said cap member.

11. A roller assembly comprising:
 a substantially cylindrical roller body having an internal bore for receipt of a one-way clutch element and a drive shaft for said roller body;
 a recess within said cylindrical roller body for retaining a spring member having first and second ends, said spring member substantially retaining said drive shaft,
 a cap member having a cam, said cap member being fixedly rotatable about said cylindrical roller body such that said cam lies between said first end and said second end of said spring member, said cam urging said first end and said second end away from each other thereby releasably disengaging said drive shaft, said recess of said cylindrical body further comprising a cam which is engaged by and contained within said cam of said cap member allowing for axial rotation about said cylindrical body.

12. A roller assembly comprising:
 a substantially cylindrical roller body having an internal bore for receipt of a one-way clutch element and a drive shaft for said roller body;
 a recess within said cylindrical roller body for retaining a spring member having first and second ends, said spring member substantially retaining said drive shaft, said spring member being a single piece of tempered steel wire which is formed into bi-helical shape; and
 a cap member having a cam, said cap member being fixedly rotatable about said cylindrical roller body such that said cam lies between said first end and said second end of said spring member, said cam urging said first end and said second end away from each other thereby releasably disengaging said drive shaft.

* * * * *